Patented Mar. 30, 1926.

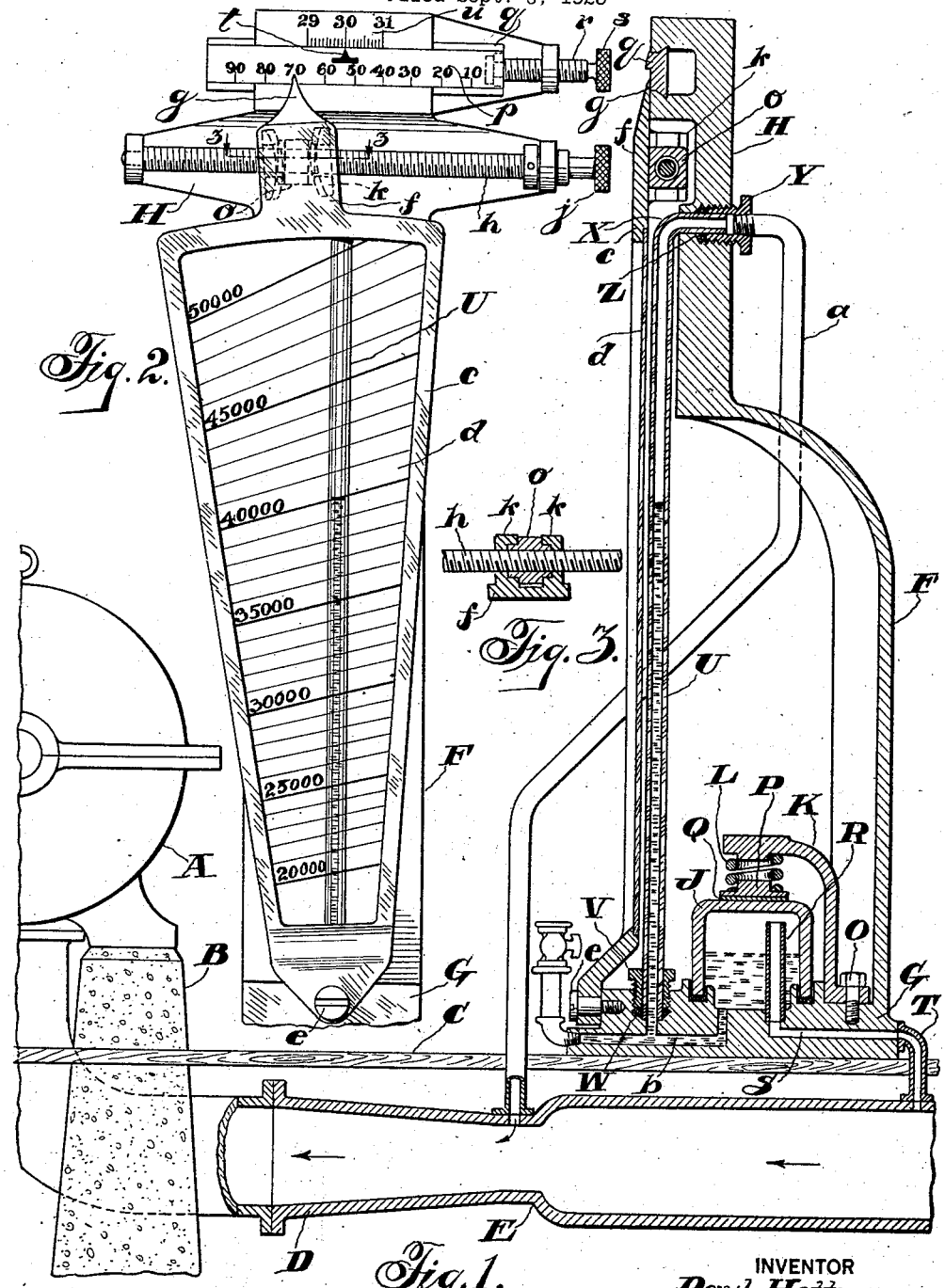

1,578,440

UNITED STATES PATENT OFFICE.

PAUL HOFFMAN, OF EAST ORANGE, NEW JERSEY, ASSIGNOR TO INGERSOLL-RAND COMPANY, OF JERSEY CITY, NEW JERSEY, A CORPORATION OF NEW JERSEY.

VOLUME-REGULATOR GAUGE.

Application filed September 8, 1923. Serial No. 661,549.

*To all whom it may concern:*

Be it known that I, PAUL HOFFMAN, a citizen of the United States, and a resident of East Orange, county of Essex, and State of New Jersey, have invented a certain Volume-Regulator Gauge, of which the following is a specification accompanied by drawings.

This invention relates to a volume regulator gauge for a gas compressor, pump blower, or the like, by means of which the fluid volume supplied to the compressor may be determined for existing barometric and temperature conditions.

In the operation of a blast furnace, it is essential that the supply of oxygen to the furnace be maintained constant for combustion purposes, so that the efficient operation of the furnace is not disturbed. When the machine is set for delivering a certain weight of oxygen per minute to the blast furnace, it is not unusual to find that the actual weight delivered has varied considerably from that which would be delivered under "standard" conditions of air, and it becomes necessary to increase or diminish the speed of the machine in order that the proper weight of oxygen may be delivered. For a given volume of air, the weight of oxygen varies according to the barometric conditions, and accordingly the speed of the machine must be regulated in accordance with the changes in barometric conditions.

The objects of the present invention are to enable the fluid volume supplied to a pump or blower to be determined for different barometric conditions in an improved and simplified manner, in order that the weight of oxygen delivered to a blast furnace or wherever required, may be maintained constant.

Another object of the invention is to produce a gauge which may be pivotally adjusted for changes in barometric conditions, to indicate the fluid volume supplied to the blower.

To these ends the invention consists of the features of construction and combinations of elements substantially as hereinafter fully described and claimed in this specification, and shown in the accompanying drawings, in which—

Figure 1 is a vertical sectional view of a constant volume regulator gauge connected to a blower, Figure 2 is a side elevation of the gauge shown in Figure 1 with part of the base removed, and Figure 3 is a horizontal detail sectional view of the adjusting means for the scale frame, taken on line 3—3 of Figure 2, looking in the direction of the arrow.

Referring to the drawings, the compressor A is shown mounted in the usual manner on the foundation B, the floor line C being shown for purposes of illustration. The intake conduit D of the compressor is preferably provided with the restricted portion in the form of a Venturi tube E, in which the velocity of the incoming fluid, such as air, is increased, producing sub-atmospheric pressure, as a Venturi tube has been found to be a convenient device for use in connection with a regulator gauge of the form described.

An up-right support or frame F, having a base G and a plate H, is shown mounted on the floor line C. The plate H and base G are shown integral with the support F, but it is to be understood that these may be separate parts, if so desired. Mounted on the base G is a reservoir J, preferably in the form of an inverted glass cup, which is held in position on the base by a yoke K and coil spring L. The yoke K is secured to the base G as by a bolt O, and the coil spring L has one end bearing against a seat P, which is spaced from the reservoir J by a washer Q of felt or other suitable material. The reservoir J communicates with the large diameter of the intake D, through the up-right tube R, passage S in the base G, and a tube T, so that the air from the intake D of the compressor A may pass into and out of the reservoir J.

An up-right tube U, preferably of glass, is secured at its lower end in the base G by a gland nut V and packing W. The upper portion of the tube U is bent, as at X, and is secured in the plate H by a gland nut Y and packing Z, and is in communication with the restricted portion E of the intake D by the pipe or tube $a$. Liquid, such as mineral oil or mercury, in the reservoir J is adapted to be drawn up into the tube U through the passage $b$ in the base G from the reservoir J by variations in the difference in pressure between the two points in the intake D to which the tubes T and $a$ are connected.

An indicating member, in this instance, comprises a frame $c$ having an insert $d$ in the form of a flat plate, preferably of celluloid, which is calibrated in fluid volumes of cubic feet per minute under standard conditions of air, as indicated by the large numbers. The frame is pivotally mounted on the base G by the screw bolt $e$, and is in this instance, arranged in front of the tube U. The insert however, may be of brass or other suitable metal, and may be placed to the rear of the tube U. The height of the liquid column in the tube U cooperates with the fluid volume scale on the insert $d$ to indicate the volume of air flowing through the intake D.

In order to adjust the gauge for changes in barometric conditions, the frame $c$ is formed in this instance with an extension $f$ having a pointer $g$ and the whole frame and pointer are adapted to be rocked about the pivot $e$ by the screw $h$, which may be rotated by the knurled head $j$, so that the pointer moves substantially horizontally. As shown in Figure 3, the frame extension $f$ is formed with the guide projections $k$, between which is located a nut $o$ threaded on the screw $h$. By rotating the knurled head $j$ on the screw in one direction or the other, the nut $o$ will travel horizontally along the screw in the direction desired in order to rock the frame $c$ and move the pointer $g$ along a temperature scale $p$ to accord with the existing temperature. As the nut $o$ moves along the screw $h$, relative sliding movement is permitted between the nut and guide projections $k$. A temperature scale member or slide $q$ having the temperature scale $p$ is adapted to slide in the plate H and may be moved horizontally by a screw $r$ which has a knurled head $s$. The slide $q$ is provided with an indicator $t$ adapted to cooperate with a barometrically calibrated scale member $u$, integral with the plate H, for adjustment in accordance with barometric pressures.

In the operation of the gauge above described, let it be assumed that the thermometer reading is 70 degrees F. and the barometer reading is 30 inches, then the screw $r$ would be rotated to move the slide $q$ until the indicator $t$ is opposite the 30 mark on the barometric scale $u$, and the screw $h$ is rotated to bring the pointer $g$ opposite the 70 mark on the temperature scale $p$. The fluid volume scale on the insert $d$ is now in the proper position relative to the liquid column in the tube U. Assuming that 40,000 cubic feet per minute is correct for delivering the proper weight of oxygen for the purpose required, and in the event that the liquid column should be above or below the 40,000 curve, the speed of the compressor A should be reduced or increased accordingly in order to bring the liquid column to the proper point on the fluid volume scale.

I claim:

1. In a volume regulator gauge for compressors, an adjustable frame pivoted at one end to the support of said gauge, a plate forming a fluid volume scale calibrated in fluid volumes under standard conditions inserted in said frame, indicating means adapted to be controlled by variations in the intake pressure of the compressor adapted to cooperate with said fluid volume scale for indicating the fluid volume supplied to the compressor, and means for oscillating the said adjustable frame about its pivot to adjust the said scale to the said indicating means for changes in barometric conditions.

2. In a volume regulator gauge for compressors, an adjustable frame pivoted at one end to the support of said gauge, a flat plate forming a fluid volume scale calibrated in fluid volumes under standard conditions inserted in said frame, a stationary barometric scale member, a temperature scale member adjustable with respect to said barometric scale member, means for adjusting the frame and the temperature scale member for changes in barometric conditions, and indicating means adapted to be controlled by variations in the intake pressure of the compressor and adapted to cooperate with the fluid volume scale for indicating the fluid volume supplied to the compressor.

3. In a volume regulator gauge for compressors, a frame pivoted at one end to the support of said gauge, a flat plate forming a fluid volume scale calibrated in fluid volumes under standard conditions inserted in the said frame, a flat stationary barometric scale member, a flat temperature scale member slidable adjacent the barometric scale member, means for manually adjusting the fluid volume scale with respect to the temperature scale member, means for manually adjusting the temperature scale member with respect to the barometric scale member, and indicating means adapted to be controlled by variations in the intake pressure of the compressor adapted to cooperate with said fluid volume scale for indicating the fluid volume supplied to the compressor.

4. In a volume regulator gauge for compressors, a support, a frame having a fluid volume scale calibrated in fluid volumes under standard conditions pivoted to said support, a stationary barometric scale member, a temperature scale member adjustable with respect to said barometric scale, means for adjusting said fluid volume scale relative to said temperature scale member, and a tube for containing a liquid column said liquid column being adapted to be controlled by variations in the intake pressure of the compressor and adapted to cooperate with said fluid volume scale for indicating the fluid volume supplied to the compressor.

In testimony whereof I have signed this specification.

PAUL HOFFMAN.